(12) United States Patent
Zhao (10) Patent No.: US 11,801,778 B2
(45) Date of Patent: Oct. 31, 2023

(54) CHILD SAFETY SEAT HAVING A HEADREST

(71) Applicant: Wonderland Switzerland AG, Steinhausen (CH)

(72) Inventor: Guanghui Zhao, Dongguan (CN)

(73) Assignee: Wonderland Switzerland AG, Steinhausen (CH)

( * ) Notice: Subject to any disclaimer, the term of this patent is extended or adjusted under 35 U.S.C. 154(b) by 71 days.

(21) Appl. No.: 17/476,681

(22) Filed: Sep. 16, 2021

(65) Prior Publication Data

US 2022/0080865 A1   Mar. 17, 2022

(30) Foreign Application Priority Data

Sep. 17, 2020 (CN) .......................... 202010983069.6

(51) Int. Cl.
    *B60N 2/28* (2006.01)
(52) U.S. Cl.
    CPC ......... *B60N 2/2851* (2013.01); *B60N 2/2806* (2013.01)
(58) Field of Classification Search
    CPC .................... B60N 2/2851; B60N 2/2806
    See application file for complete search history.

(56) References Cited

U.S. PATENT DOCUMENTS

2008/0111412 A1   5/2008  Woellert et al.
2019/0344694 A1  11/2019  Johnson et al.

FOREIGN PATENT DOCUMENTS

| CN | 208978678 U | 6/2019 |
| CN | 210047367 U | 2/2020 |
| EP | 2913222 A1 * | 9/2015 |
| EP | 3608165 A1 | 2/2020 |
| EP | 3666589 A1 | 6/2020 |
| TW | 200718598 A | 5/2007 |

OTHER PUBLICATIONS

Office Action of the corresponding German Patent Application No. 102021124002.6 (along with an English summary) dated Dec. 16, 2022.
Office Action of the corresponding Taiwanese patent application No. 110134766 (along with an English Search Report) dated Apr. 10, 2023.

* cited by examiner

*Primary Examiner* — Anthony D Barfield
(74) *Attorney, Agent, or Firm* — NZ CARR LAW OFFICE PLLC (57) ABSTRACT

A child safety seat includes a seat portion, and a backrest assembly configured to connect with the seat portion. The backrest assembly includes a backrest portion and a headrest portion, the headrest portion including a headrest mounting part adapted to connect with the backrest portion so that the headrest portion is held with the backrest portion via the headrest mounting part, and a head support that is adapted to provide support for a child's head and is installable on and removable from the headrest mounting part.

18 Claims, 8 Drawing Sheets

CHILD SAFETY SEAT HAVING A HEADREST

CROSS-REFERENCE TO RELATED APPLICATION(S)

This application claims priority to China patent application no. 202010983069.6 filed on Sep. 17, 2020.

BACKGROUND

1. Field of the Invention

The present invention relates to child safety seats having a headrest.

2. Description of the Related Art

A child safety seat is typically used in an automobile vehicle to properly restrain a child in the event of accidental collision. The child safety seat usually includes a backrest portion having a headrest that can be vertically adjusted to adapt to children of different sizes. Conventionally, the headrest is formed by plastic parts that are attached to each other via adhesives. The use of adhesives requires specific manufacturing steps such as applying the adhesives, which adds fabrication costs and time.

Therefore, there is a need for an improved design that can address at least the foregoing issues.

SUMMARY

The present application describes a child safety seat having a headrest portion that can be manufactured in a cost-effective manner and address at least the foregoing issues.

According to one aspect, the child safety seat includes a seat portion, and a backrest assembly configured to connect with the seat portion. The backrest assembly includes a backrest portion and a headrest portion, the headrest portion including a headrest mounting part adapted to connect with the backrest portion so that the headrest portion is held with the backrest portion via the headrest mounting part, and a head support that is adapted to provide support for a child's head and is installable on and removable from the headrest mounting part.

DETAILED DESCRIPTION OF THE EMBODIMENTS

Figure 1:
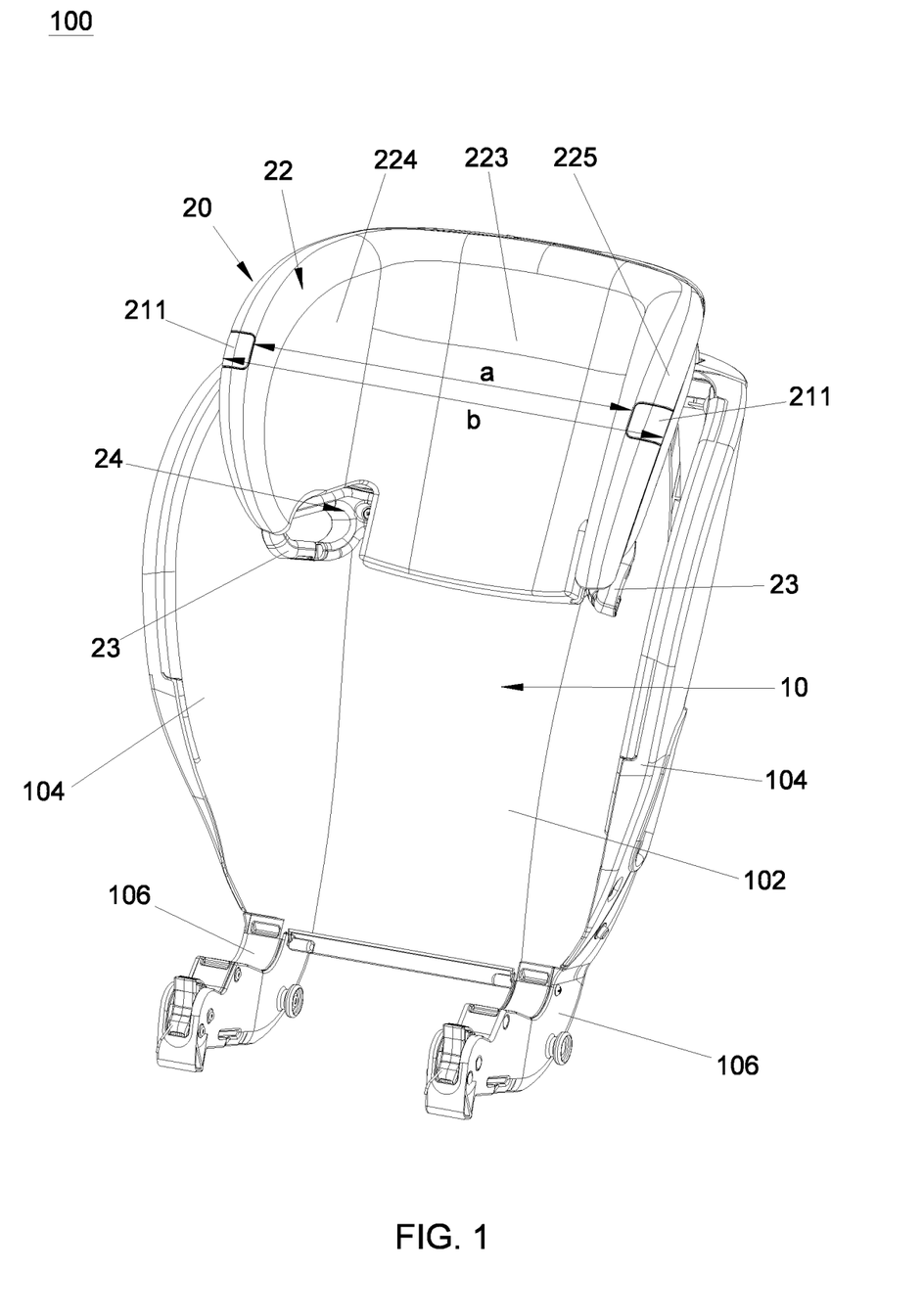
FIG. 1 is a perspective view illustrating an embodiment of a backrest assembly for a child safety seat.

FIG. 1 is a perspective view illustrating an embodiment of a backrest assembly 100 for a child safety seat. Referring to FIG. 1, the backrest assembly 100 includes a backrest portion 10, and a headrest portion 20 coupled to the backrest portion 10. The backrest portion 10 has a central support portion 102 that can face a child's back in use, and two sidewalls 104 respectively protruding forward at a left and a right side of the central support portion 102. According to an example of construction, the backrest portion 10, including the central support portion 102 and the two sidewalls 104, may be formed by rigid materials including, without limitation, plastics. The central support portion 102 and the two sidewalls 104 defines at least partially an inner space adapted to receive a child's back.

Moreover, the backrest portion 10 may have a lower end provided with backrest coupling parts 106 for attachment to a seat portion of a child safety seat. According to an example of construction, the backrest coupling parts 106 may be configured to be detachably connectible with a seat portion of a child safety seat for facilitating installation and removal of the backrest assembly 100.

The headrest portion 20 can be slidably connected with the backrest portion 10 so that the headrest portion 20 is movable upward and downward relative to the backrest portion 10. For example, the headrest portion 20 may be disposed so as to be movable vertically along the central support surface 102 between the two sidewalls 104 of the backrest portion 10. The height of the headrest portion 20 is thereby adjustable to adapt to children of different sizes.

Figure 2:
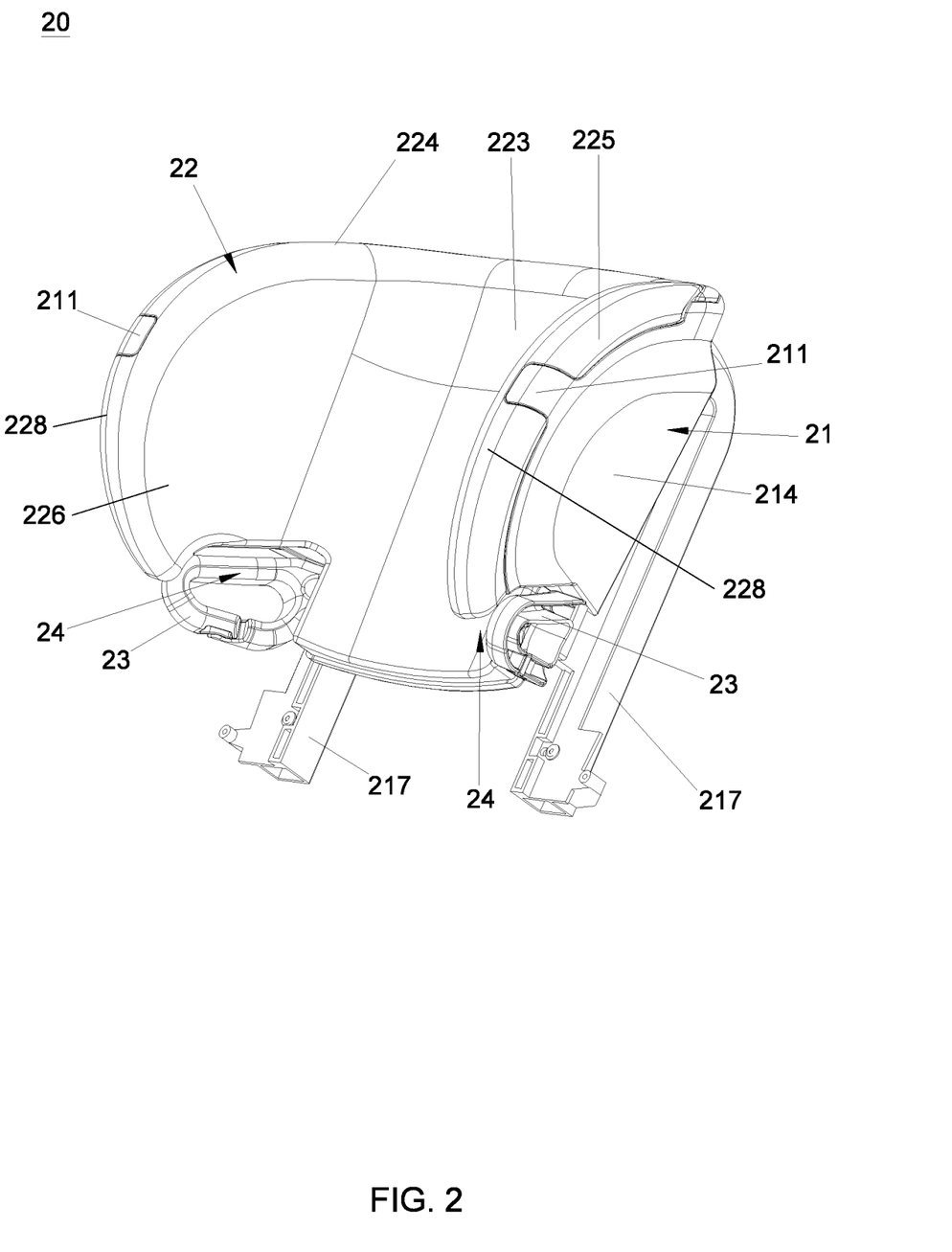
FIG. 2 is a perspective view illustrating a headrest portion provided in the backrest assembly of FIG. 1.

In conjunction with FIG. 1, FIG. 2 is a perspective view illustrating the headrest portion 20 alone. Referring to FIGS. 1 and 2, the headrest portion 20 includes a headrest mounting part 21, and a head support 22 detachably connected with the headrest mounting part 21. The headrest mounting part 21 is adapted to connect with the backrest portion 10 so that the headrest portion 20 can be held with the backrest portion 10 via the headrest mounting part 21. The head support 22 is adapted to provide support for a child's head, and is installable on and removable from the headrest mounting part 21 as desired. The ability to detachably connect the head support 22 with the headrest mounting part 21 can offer convenient assembly of the headrest portion 20. For example, the head support 22 can be assembled with the headrest mounting part 21 to form the headrest portion 20 without using adhesives. While the headrest mounting part 21 remains coupled to the backrest portion 10, the head support 22 may be removed from the headrest mounting part 21 for replacement or repair or for disabling the use of the headrest portion 20, and can be installed on the headrest mounting part 21 for use to provide support for a child's head.

Figure 3:
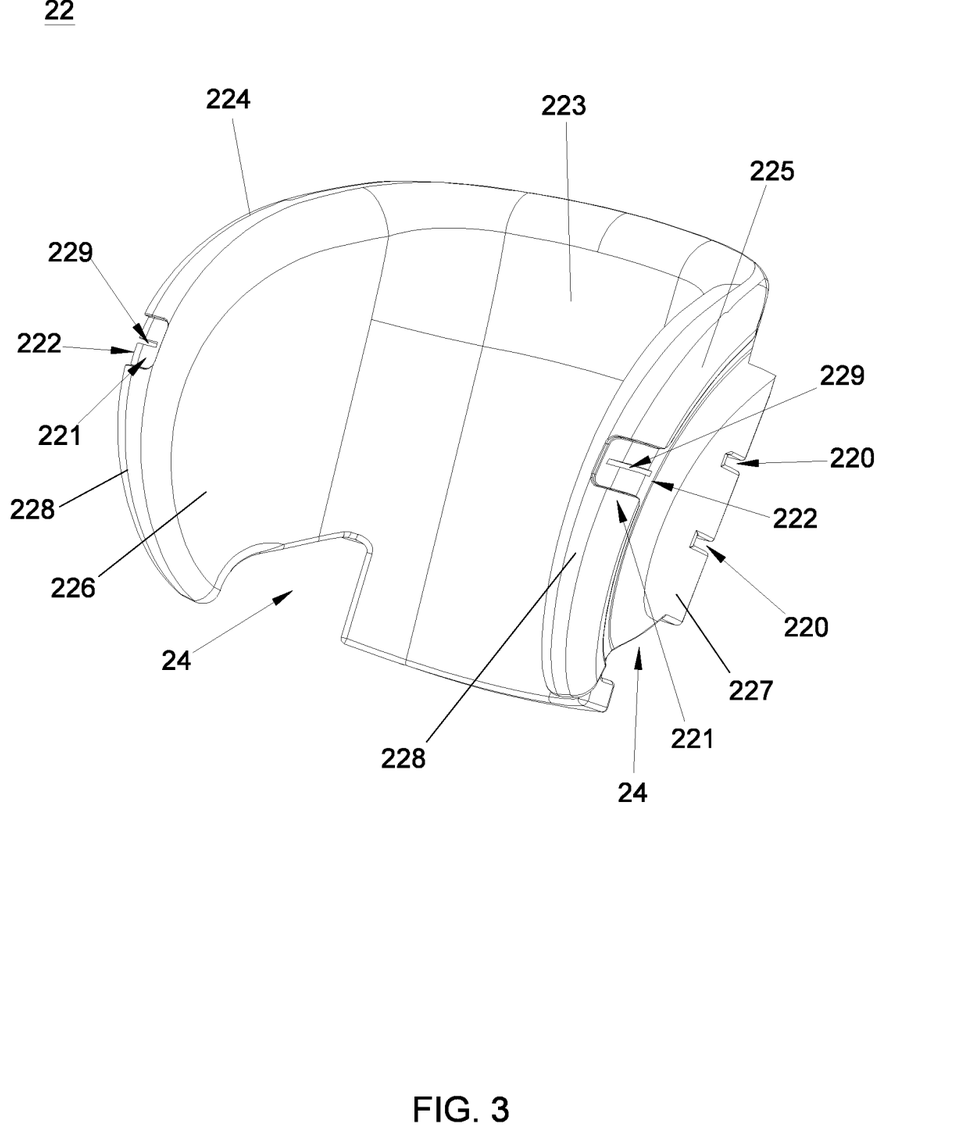
FIG. 3 is a perspective view illustrating a head support of the headrest portion shown in FIG. 2.
Figure 4:
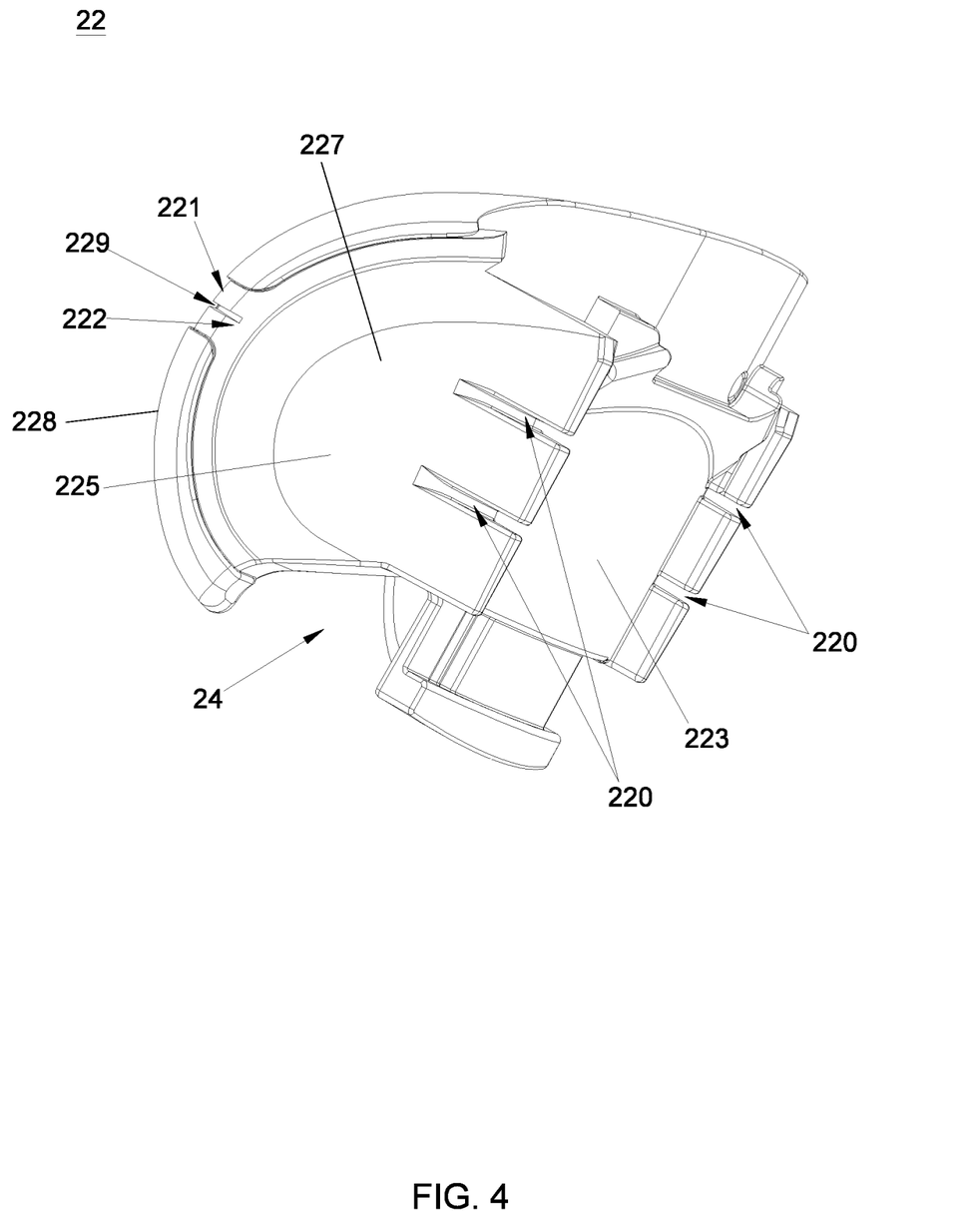
FIG. 4 is another perspective view of the head support shown in FIG. 3

In conjunction with FIG. 2, FIGS. 3-7 are various views illustrating further construction details of the headrest mounting part 21 and the head support 22. Referring to FIGS. 2-4, the head support 22 is configured to provide suitable support for a child's head. The head support 22 has a central support portion 223 that can face a child's head in use, and two sidewalls 224 and 225 that are connected with the central support portion 223 and respectively protrude forward at a left and a right side of the central support portion 223. For example, the two sidewalls 224 and 225 may be symmetrically disposed at the left and right sides of the central support portion 223 so that the central support portion 223 and the two sidewalls 224 and 225 form a U-shape. The central support portion 223 and the two sidewalls 224 and 225 define at least partially an inner space adapted to receive a child's head, wherein the central support portion 223 provide rearward support for the child's head, and the two sidewalls 224 and 225 can limit sideways displacement of the child's head. The head support 22, including the the central support portion 223 and the two sidewalls 224 and 225, may be formed by any suitable materials, which may include, without limitation, plastics. For example, the head support 22 can be formed from expanded polystyrene (EPS).

Figure 5:
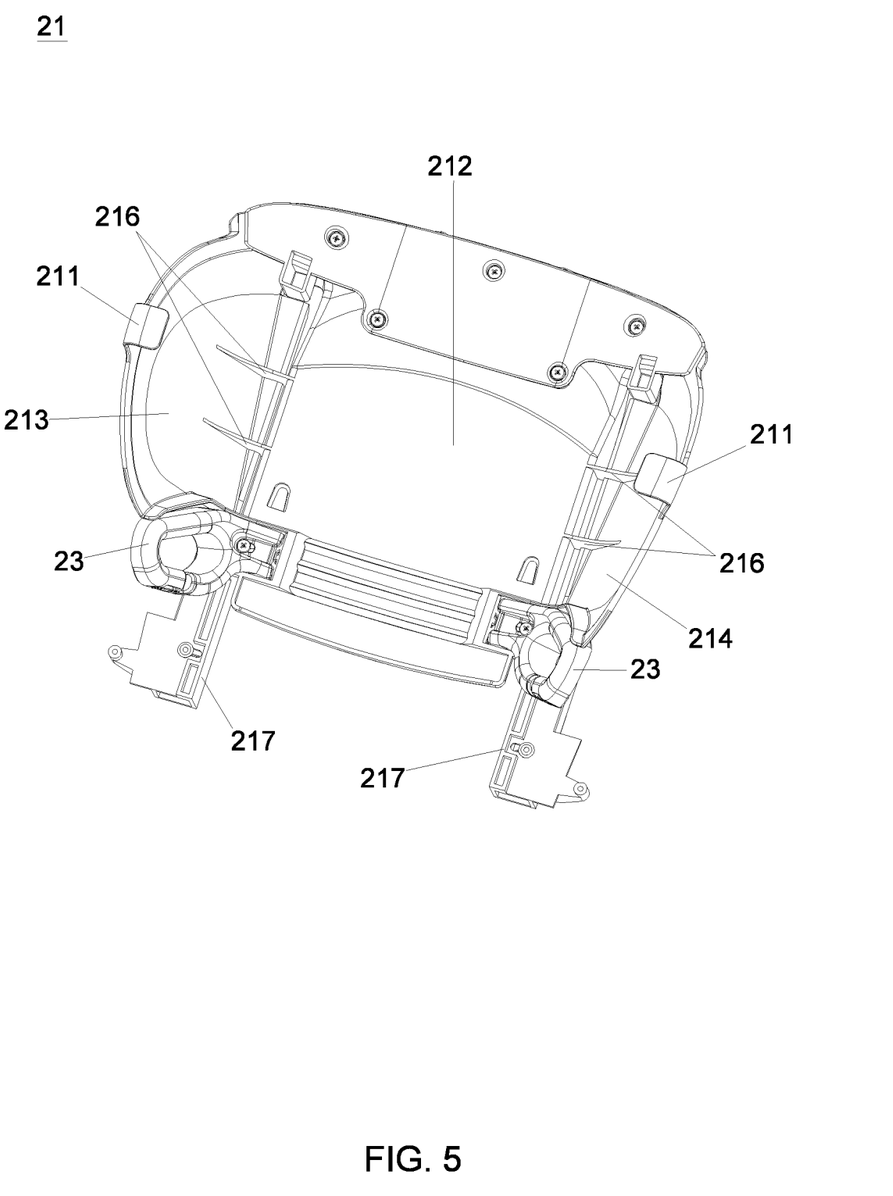
FIG. 5 is a perspective view illustrating a headrest mounting part of the headrest portion shown in FIG. 2.
Figure 6:
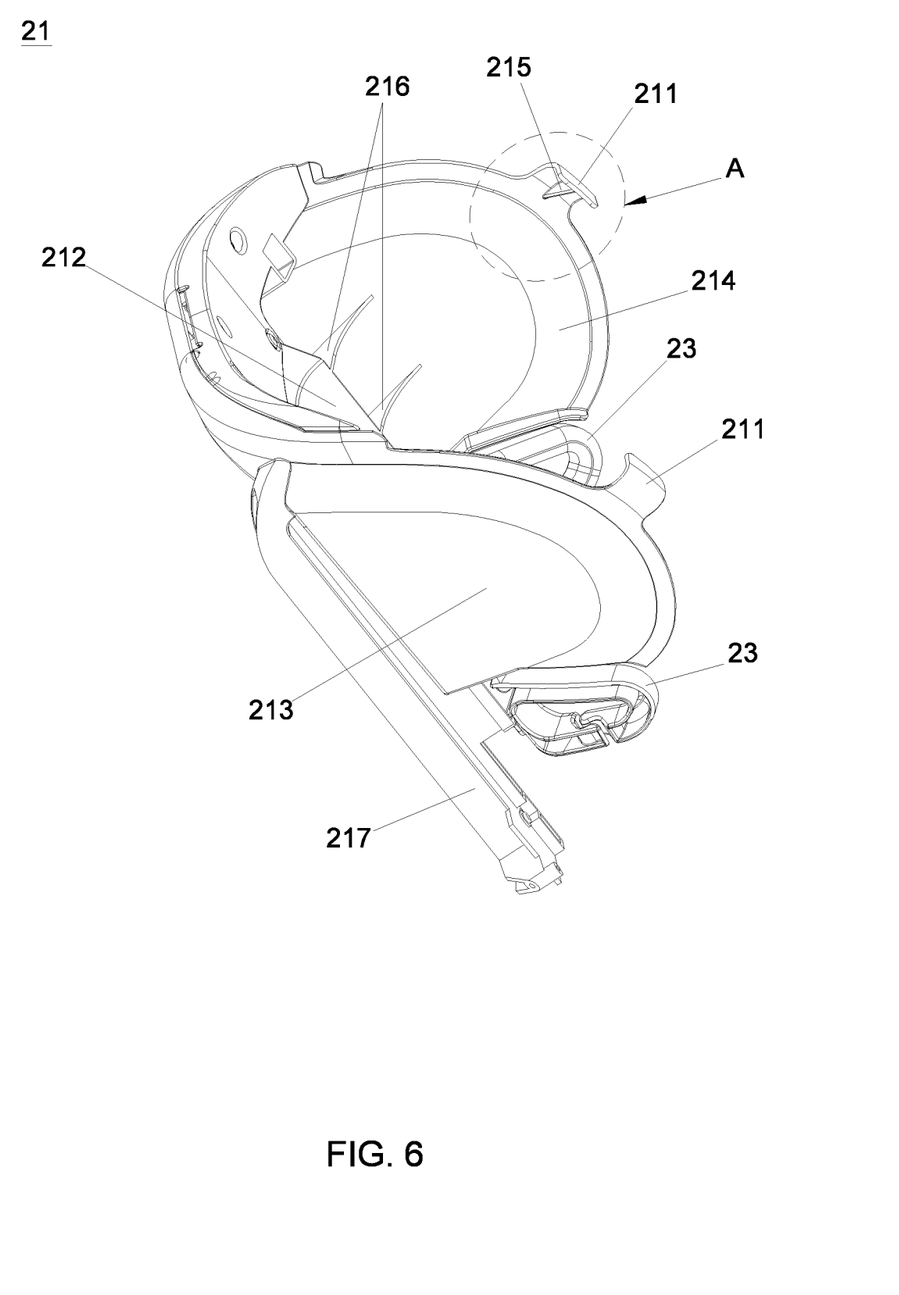
FIG. 6 is another perspective view of the headrest mounting part shown in FIG. 5.
Figure 7:
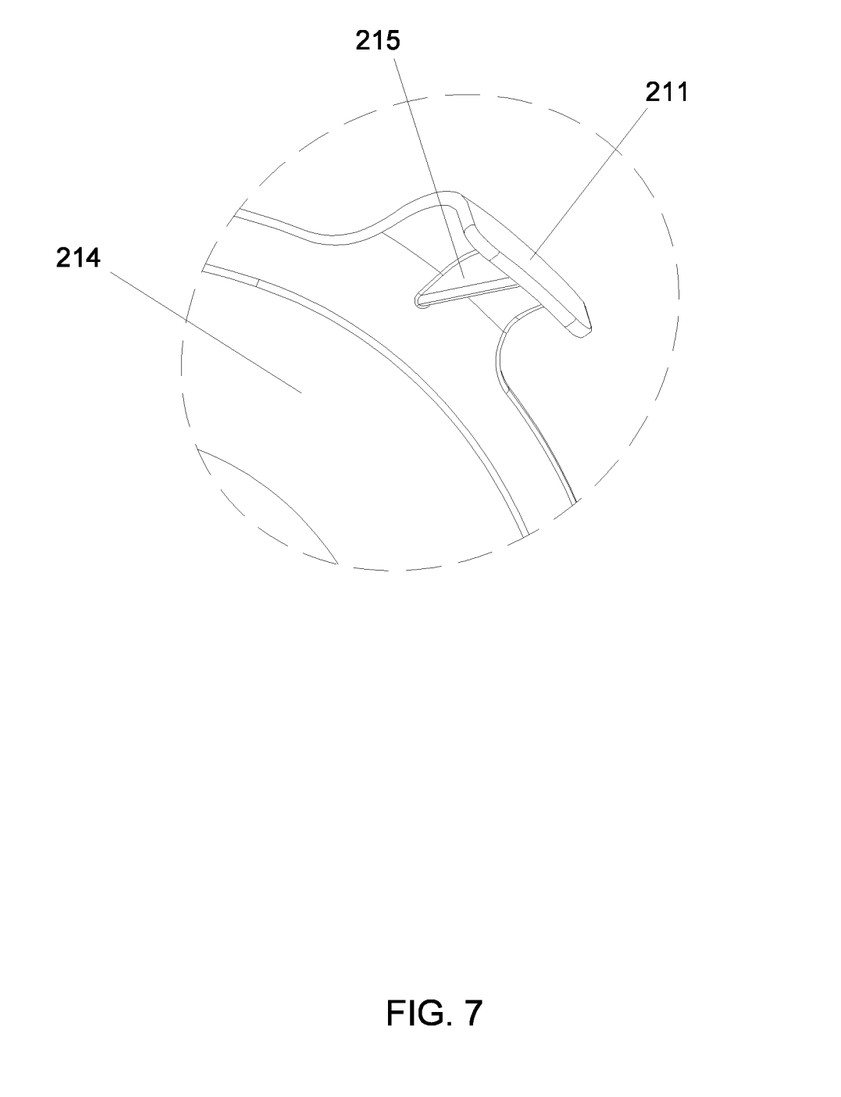
FIG. 7 is an enlarged view of portion A shown in FIG. 6.

Referring to FIGS. 5 and 6, the headrest mounting part 21 is configured to provide a suitable mounting support for the head support 22. According to an example of construction, the headrest mounting part 21 can include a central portion 212, and two sidewalls 213 and 214 that are connected with the central portion 212 and respectively protrude forward at a left and a right side of the central portion 212. For example, the two sidewalls 213 and 214 may be symmetrically disposed at the left and right sides of the central portion 212 so that the central portion 212 and the two sidewalls 213 and 214 form a U-shape. The headrest mounting part 21, including the central portion 212 and the two sidewalls 213 and 214, may be formed by any suitable rigid materials, which may include, without limitation, rigid plastics. According to an example of construction, the central portion 212 and the two sidewalls 213 and 214 of the headrest mounting part 21 may be formed integrally as a single part. The central portion 212 and the two sidewalls 213 and 214 at least partially define an inner space adapted to receive the head support 22.

According to an example of construction, the central portion 212 and the two sidewalls 213 and 214 of the headrest mounting part 21 can respectively match at least partially in shape or profile with the central support portion 223 and the two sidewalls 224 and 225 of the head support 22. This may facilitate installation and removal of the head support 22 with respect to the headrest mounting part 21, and the headrest portion 20 may have a compact form once the head support 22 is assembled with the headrest mounting part 21. Once the head support 22 is assembled with the headrest mounting part 21, the central support portion 223 of the head support 22 is positioned adjacent to the central portion 212 of the headrest mounting part 21 and the two sidewalls 224 and 225 of the head support 22 are respectively positioned adjacent to the two sidewalls 213 and 214 of the headrest mounting part 21, the central portion 212 and the two sidewalls 213 and 214 of the headrest mounting part 21 outwardly surrounding the central support portion 223 and the two sidewalls 224 and 225 of the head support 22.

Referring to FIGS. 1, 2, 5 and 6, the headrest mounting part 21 is configured to connect with the backrest portion 10 so that the headrest portion 20 can be held with the backrest portion 10 via the headrest mounting part 21. For example, the headrest mounting part 21 can have two bars 217 that are respectively received in two corresponding slots (not shown) provided in the backrest portion 10 for slidably coupling the headrest portion 20 to the backrest portion 10. The two bars 217 are transversally spaced-apart from each other, and are fixedly connected with the sidewalls 213 and 214 or the central portion 212 of the headrest mounting part 21 at a rear thereof. The two bars 217 can project downward from the sidewalls 213 and 214 and the central portion 212 for facilitating its assembly with the backrest portion 10.

Referring to FIGS. 2-7, the head support 22 is configured to couple to the headrest mounting part 21 via a detachable connection. The detachable connection can include at least one solid fastening part provided on one of the headrest mounting part 21 and the head support 22, which is operable to engage and disengage the other one of the headrest mounting part 21 and the head support 22 for respectively locking and unlocking the head support 22 with respect to the headrest mounting part 21. Examples of detachable connections using fastening parts as described previously may include, without limitation, snap-fitting connections. According to some examples of construction, the at least one fastening part may be provided at an outer edge of one of the headrest mounting part 21 and the head support 22, and is operable to engage and disengage an outer edge of the other one of the headrest mounting part 21 and the head support 22 for respectively locking and unlocking the head support 22 with respect to the headrest mounting part 21. In the illustrated example, the detachable connection includes at least one fastening part 211 carried with the headrest mounting part 21, which is operable to engage and disengage the head support 22 for locking and unlocking the head support 22 with respect to the headrest mounting part 21. For example, the at least one fastening part 211 can be provided at an outer edge of the headrest mounting part 21, and can engage with an outer edge of the head support 22 to lock the head support 22 to the headrest mounting part 21 and disengage from the outer edge of the head support 22 for removing the head support 22 from the headrest mounting part 21.

According to an example of construction, at least two fastening parts 211 are respectively provided on the two sidewalls 213 and 214 of the headrest mounting part 21, the two fastening parts 211 being operable to respectively engage with the two sidewalls 224 and 225 of the head support 22 for locking the head support 22 to the headrest mounting part 21. Each of the two fastening parts 211 can be exemplarily formed as a resilient tab that protrudes from an outer edge of the corresponding sidewall 213 or 214 and has a bend portion, e.g., an inward bend projecting toward a central region between the two sidewalls 213 and 214 of the headrest mounting part 21. For example, each of the fastening parts 211 can protrude forward from the outer edge of the corresponding sidewall 213 or 214 between a top and a bottom thereof. According to an example of construction, the fastening parts 211 may be formed integrally with the sidewalls 213 and 214 of the headrest mounting part 21.

The two fastening parts 211 can respectively engage with two receiving regions 221 on the two sidewalls 224 and 225 for locking the head support 22 to the headrest mounting part 21, and disengage from the two receiving regions 221 for unlocking and removing the head support 22 from the headrest mounting part 21. Each of the two receiving regions 221 can exemplarily include a sunken area 222 provided on an outer edge 228 of a corresponding one of the two sidewalls 224 and 225. Each of the two sidewalls 224 and 225 can have an inner surface 226 facing a central region between the sidewalls 224 and 225, an outer surface 227 opposite to the inner surface 226, and the outer edge 228 can be respectively connected with the inner surface 226 and the outer surface 227 and can have a curved shape extending between a top and a bottom of the sidewall 224 or 225. Each sunken area 222 can generally face forward on the outer edge 228. Moreover, each sunken area 222 can be open on an outer side of the corresponding one of the two sidewalls 224 and 225 so that the corresponding fastening part 211 can insert into the sunken area 222 from the outer side of the corresponding one of the two sidewalls 224 and 225. Each sunken area 222 and the corresponding fastening part 211 can have mutually matching shapes so that the fastening part 211 can engage and fit into the sunken area 222 for locking the head support 22 to the headrest mounting part 21.

The fastening parts 211 may be provided at any suitable locations on the two sidewalls 213 and 214 of the headrest mounting part 21. According to an example of construction, the two fastening parts 211 are disposed symmetrically on the two sidewalls 213 and 214, each of the two fastening parts 211 being located between a top and a bottom of the corresponding one of the two sidewalls 213 and 214. A transversal distance "a" (better shown in FIG. 1) can be defined between the two fastening parts 211, which can correspond to the transversal distance between the respective distal ends of the two fastening parts 211 when the two fastening parts 211 are in a locking state. Correspondingly, the two sunken areas 222 are disposed symmetrically on the two sidewalls 224 and 225, each of the two sunken areas 222 being located between a top and a bottom of the corresponding one of the two sidewalls 224 and 225. A transversal distance "b" (better shown in FIG. 1) can be defined between the two sunken areas 222, which can correspond to the transversal distance between the respective openings of the two sunken areas 222 on the outer sides of the two sidewalls 224 and 225. The two fastening parts 211 are configured so that the transversal distance "a" is smaller than the transversal distance "b". During installation, the two fastening parts 211 can deflect outward away from each other as the head support 22 is placed over the headrest mounting part 21, and can elastically move toward each other and respectively engage with the sunken areas 222 once the head support 22 is properly positioned relative to the headrest mounting part 21. The two fastening parts 211 can thereby apply a clamping action that securely holds the head support 22 against the headrest mounting part 21, preventing forward displacement of the head support 22 away from the headrest mounting part 21. For removing the head support 22 from the headrest mounting part 21, each of the fastening parts 211 may be pulled to disengage from the corresponding sunken area 222. The head support 22 is thereby unfastened and can be removed from the headrest mounting part 21.

Referring to FIGS. 3, 4, 6 and 7, each of the two fastening parts 211 can optionally have a protruding rib 215 that can be received at least partially in a slit 229 provided inside the corresponding one of the two sunken areas 222 when the fastening part 211 engages with the sunken area 222. The rib 215 can exemplarily protrude from an inner surface of the fastening part 211, e.g., the rib 215 can be disposed on the inner surface of the fastening part 211 adjacent to a bending region thereof. The slit 229 can be exemplarily formed on a bottom surface of the sunken area 222 and can be open on an outer side thereof. When the fastening part 211 engages with the sunken area 222, the rib 215 can be at least partially received inside the slit 229 to provide a further engagement structure for increased locking strength. Although the illustrated example places the rib 215 on the fastening part 211 and the slit 229 inside the sunken area 222, it will be appreciated that the rib 215 and the slit 229 may be interchanged in position to likewise provide a further engagement structure for increased locking strength.

The aforementioned example provides a detachable connection in which the fastening parts 211 are carried with the headrest mounting part 21 and the receiving regions 221 are provided on the head support 22. It will be appreciated, however, that the fastening parts 211 and the receiving regions 221 may be interchanged in position. For example, a variant example can provide a detachable connection in which fastening parts similar to the fastening parts 211 are carried with the head support 22, and receiving regions similar to the receiving regions 221 are provided on the headrest mounting part 21.

Referring to FIGS. 2-6, the headrest portion 20 can further include a positioning structure separate from the fastening parts 211 for facilitating the installation of the head support 22 on the headrest mounting part 21 and restricting vertical displacement of the head support 22 relative to the headrest mounting part 21. For example, the positioning structure can include at least one protruding rib provided on one of the headrest mounting part 21 and the head support 22, which can be received in at least one corresponding slit provided on the other one of the headrest mounting part 21 and the head support 22. In the illustrated example of FIGS. 2-6, the positioning structure includes a plurality of protruding ribs 216 provided on the headrest mounting part 21, which can respectively engage with a plurality of slits 220 provided on the head support 22 when the headrest mounting part 21 and the head support 22 are assembled with each other. For example, the ribs 216 can be symmetrically disposed on the two sidewalls 213 and 214 of the headrest mounting part 21 at an inner side thereof (i.e., within the inner space adapted to receive the head support 22), and can extend along a transversal direction with a varying thickness. According to an example of construction, the ribs 216 can be formed integrally with the sidewalls 213 and 214. Correspondingly, the slits 220 can be symmetrically disposed on the two sidewalls 224 and 225 of the head support 22 on the outer surfaces 227 thereof. Once the head support 22 is installed on the headrest mounting part 21, the engagement of the ribs 216 with the slits 220 can prevent vertical displacement of the head support 22 relative to the headrest mounting part 21.

Although the aforementioned example places the ribs 216 on the headrest mounting part 21 and the slits 220 on the head support 22, it will be appreciated that the ribs 216 and the slits 220 may be interchanged in position. Moreover, the positioning structure including the ribs 216 and the slits 220 may be disposed at any suitable locations other than those of the illustrated example.

Referring to FIGS. 1-6, the headrest portion 20 can further include a belt guide structure for facilitating the installation of a vehicle safety belt around the backrest assembly 100. For example, the headrest mounting part 21 can be fixedly connected with two belt guides 23, which can be respectively disposed symmetrically at an underside of the two sidewalls 213 and 214. Each belt guide 23 can have a loop structure adapted to receive the passage of a vehicle safety belt. Correspondingly, the head support 22 can have two concavities 24 respectively provided symmetrically below the two sidewalls 224 and 225, which can be respectively positioned adjacent to the two belt guides 23 when the head support 22 is assembled with the headrest mounting part 21. Of course, it will be appreciated that the belt guide structure may have a variant construction in which the belt guides 23 and the concavities 24 are interchanged in position. During use, once the headrest portion 20 is adjusted to a desirable height relative to the backrest portion 10, a vehicle safety belt can be installed through the belt guide 23 and the concavity 24 at one of the left and right side for restraining a child.

The manufacture of the backrest assembly 100 can include providing the headrest mounting part 21 and the head support 22, and attaching the head support 22 to the headrest mounting part 21 with the fastening parts 211 to form the headrest portion 20. Then the headrest portion 20 is assembled with the backrest portion 10 by inserting the two bars 217 into the backrest portion 10, thereby forming the backrest assembly 100.

Figure 8:
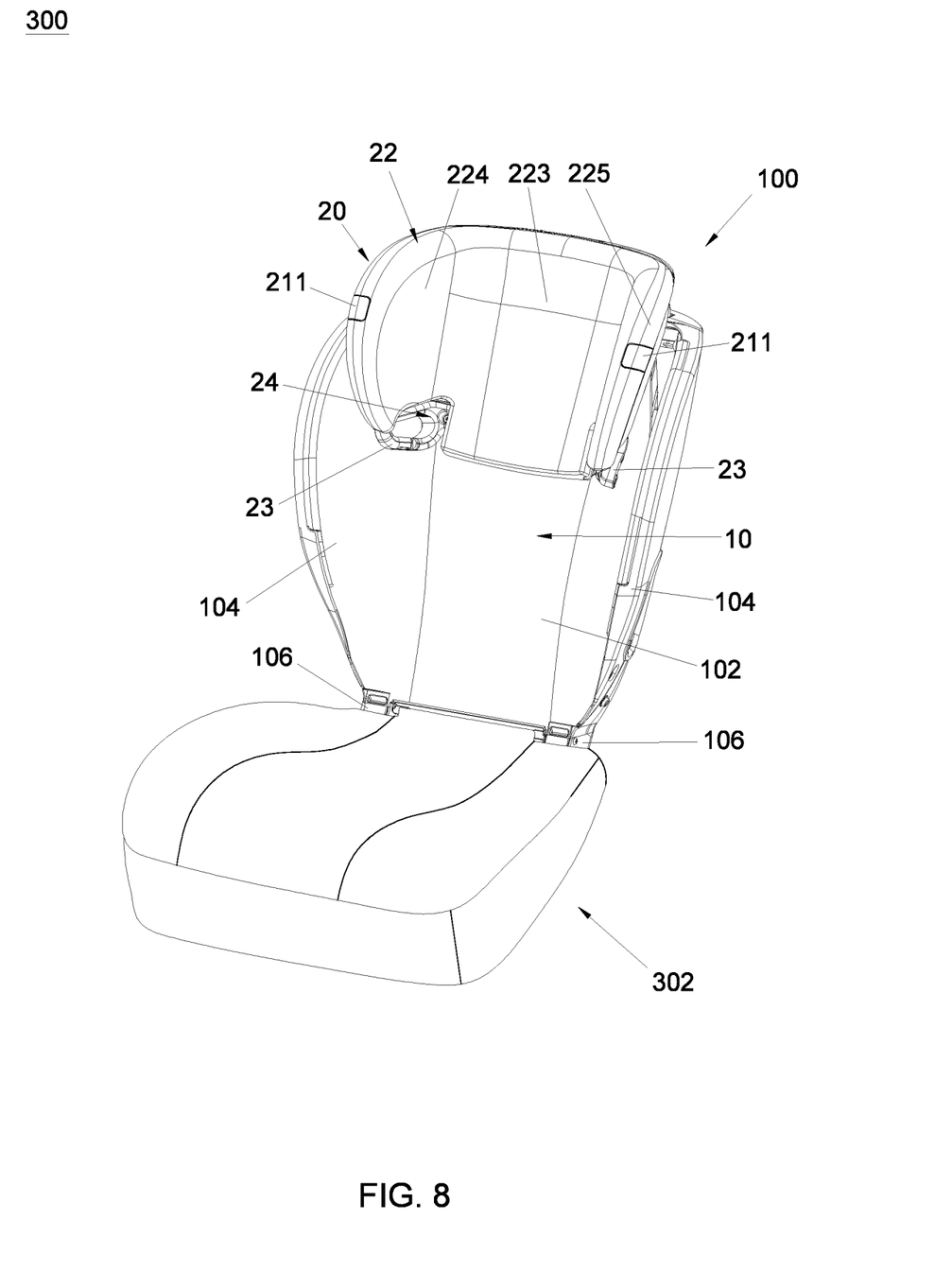
FIG. 8 is a schematic view illustrating a child safety seat incorporating the backrest assembly of FIG. 1.

In conjunction with FIGS. 1-7, FIG. 8 is a schematic view illustrating a child safety seat 300 including the backrest assembly 100. Referring to FIG. 8, the child safety seat 300 can include a seat portion 302 and the backrest assembly 100 described previously. The backrest assembly 100 can be connected with the seat portion 302 at a rear thereof.

Advantages of the structures described herein include the ability to provide a headrest portion for a child safety seat that includes a headrest mounting part and a head support attached to each other without using adhesives, which offers convenient assembly of the headrest portion and contributes to simplify the manufacture process.

Realization of the headrest portion, the backrest assembly and its application in a child safety seat have been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. A child safety seat comprising:
    a seat portion; and
    a backrest assembly configured to connect with the seat portion, the backrest assembly including a backrest portion and a headrest portion, the headrest portion including a headrest mounting part adapted to connect with the backrest portion so that the headrest portion is held with the backrest portion via the headrest mounting part, and a head support that is adapted to provide support for a child's head and is installable on and removable from the headrest mounting part;
    wherein the headrest mounting part includes a central portion and two first sidewalls that are connected with the central portion and respectively protrude forward at a left and a right side of the central portion, and the head support has two second sidewalls respectively corresponding to the two first sidewalls, at least one of the two first sidewalls having a fastening part that is operable to engage with a corresponding one of the two second sidewalls for locking the head support to the headrest mounting part, the fastening part having an inward bend that projects toward a central region between the two first sidewalls and is engageable with an outer edge of the corresponding one of the two second sidewalls.

2. The child safety seat according to claim 1, wherein the fastening part achieves a snap-fitting connection.

3. The child safety seat according to claim 1, wherein, the fastening part is formed integrally with the at least one of the two first sidewalls.

4. The child safety seat according to claim 1, wherein the fastening part is provided at an outer edge of the headrest mounting part, and is operable to engage and disengage the outer edge of the corresponding one of the two second sidewalls of the head support for locking and unlocking the head support with respect to the headrest mounting part.

5. The child safety seat according to claim 4, wherein the at least one fastening part includes a resilient tab, and is operable to engage and disengage a sunken area on the outer edge of the corresponding one of the two second sidewalls of the head support for locking and unlocking the head support with respect to the headrest mounting part.

6. The child safety seat according to claim 5, wherein the fastening part has a protruding rib that is adapted to be received at least partially in a slit provided inside the sunken area when the fastening part engages with the sunken area.

7. The child safety seat according to claim 1, wherein the fastening part is a resilient tab formed to include the inward bend projecting toward the central region between the two first sidewalls.

8. The child safety seat according to claim 1, wherein the fastening part is operable to engage with a receiving region provided on the outer edge of the corresponding one of the two second sidewalls.

9. The child safety seat according to claim 8, wherein the receiving region includes a sunken area provided on the outer edge.

10. The child safety seat according to claim 9, wherein the sunken area and the fastening part have matching shapes so that the fastening part fits into the sunken area for locking the head support to the headrest mounting part.

11. The child safety seat according to claim 1, wherein the headrest portion further include a positioning structure including a protruding rib provided on one of the headrest mounting part and the head support, which is adapted to be received in a slit provided on the other one of the headrest mounting part and the head support.

12. The child safety seat according to claim 11, wherein the rib is formed integrally with one of the two first sidewalls and disposed at an inner side thereof.

13. The child safety seat according to claim 1, wherein one of the headrest mounting part and the head support is fixedly connected with two belt guides adapted to receive the passage of a vehicle safety belt.

14. The child safety seat according to claim 13, wherein the two belt guides are fixedly connected with the headrest mounting part, and the head support has two concavities that are respectively positioned adjacent to the two belt guides when the head support is assembled with the headrest mounting part.

15. The child safety seat according to claim 1, wherein the headrest mounting part includes two transversally spaced-apart bars adapted to be received in the backrest portion for slidably coupling the headrest portion to the backrest portion.

16. The child safety seat according to claim 1, wherein the corresponding one of the two second sidewalls of the head support has an outer surface facing the headrest mounting part, and an inner surface opposite to the outer surface, the outer edge of the corresponding one of the two second sidewalls being connected with the outer surface and the inner surface.

17. The child safety seat according to claim 1, wherein the outer edge of the corresponding one of the two second sidewalls faces forward.

18. The child safety seat according to claim 1, wherein the fastening part is movable sideways away from and toward the central region between the two first sidewalls.

* * * * *